Sept. 22, 1959     O. J. ATCHLEY     2,905,143
CALF FEEDER
Filed Oct. 9, 1957     2 Sheets-Sheet 1
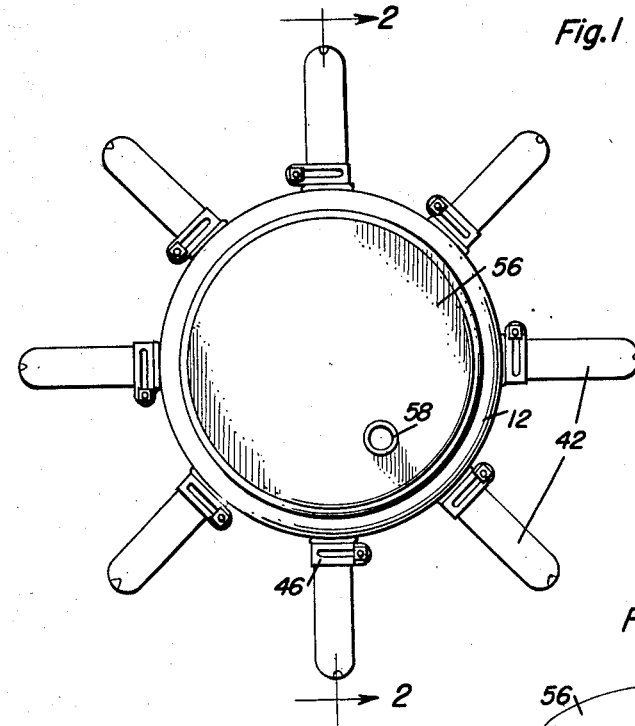
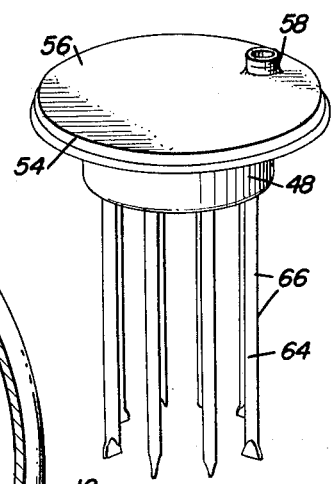
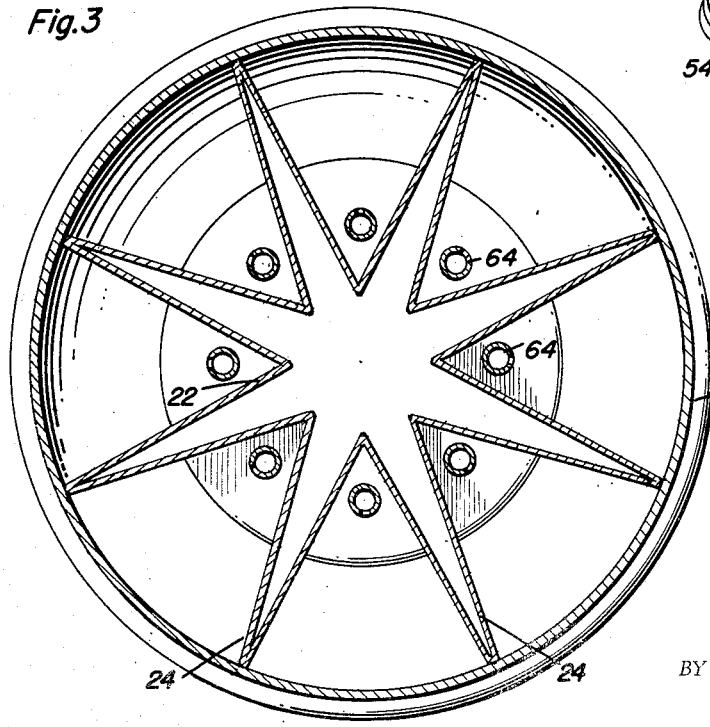
Oscar J. Atchley
INVENTOR.

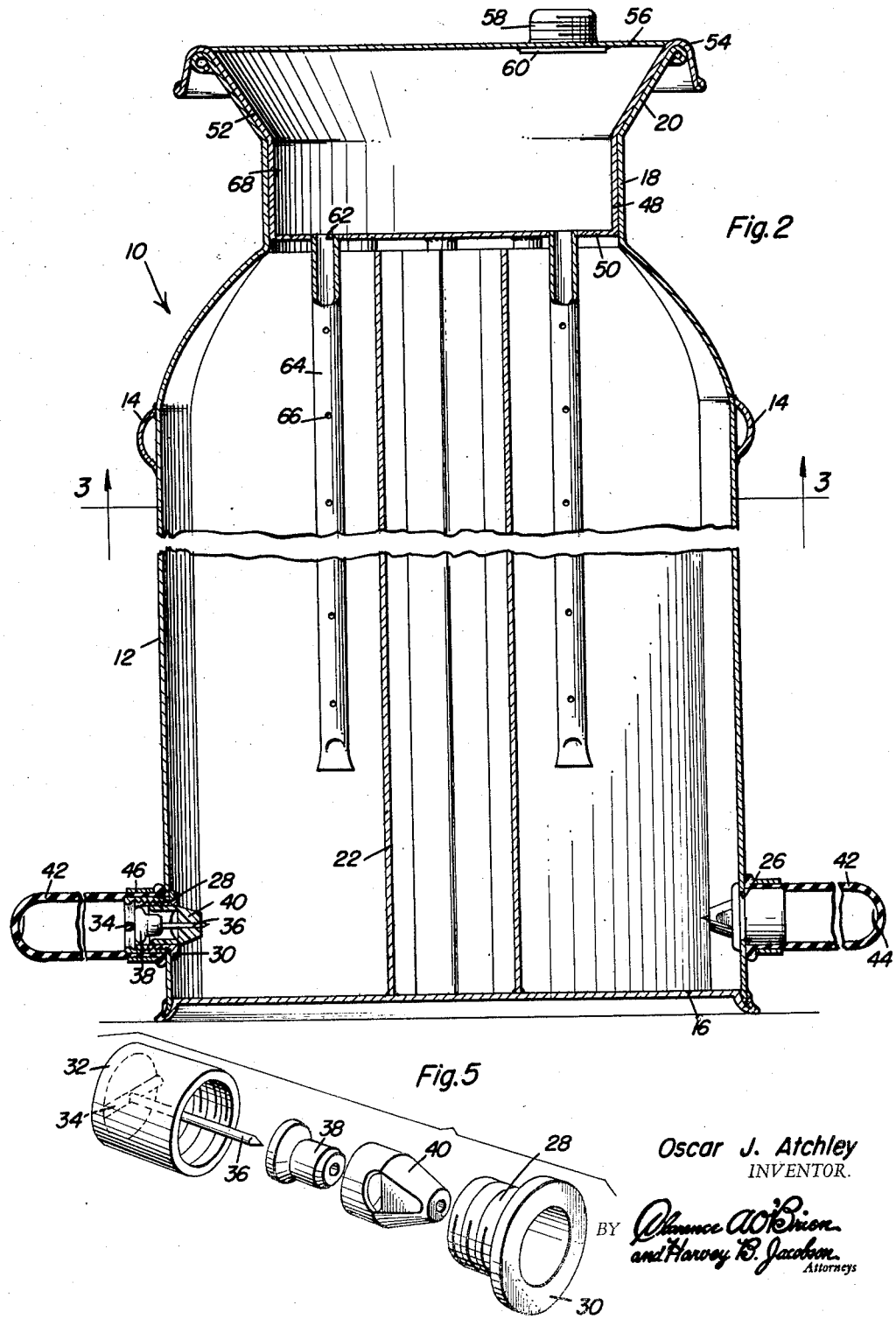

2,905,143
CALF FEEDER

Oscar J. Atchley, El Dorado Springs, Mo.

Application October 9, 1957, Serial No. 689,216

2 Claims. (Cl. 119—71)

This invention relates generally to a feeder for animals, and more specifically to an automatic calf feeder.

In the feeding of animals, especially calves, a problem exists when it is desired to artificially feed the calves, instead of letting them nurse from the mother cow. When so feeding these animals, care must be taken so that the animal will receive the food quickly, and will not take in an excess of air with the food, because if this happens, the calves may become pot gutted, or get scours. Therefore, it is the primary object of this invention to provide an automatic calf feeder for a plurality of animals, wherein new and novel means are provided so that the calves will not take in an excessive amount of air when they are eating.

Another object of this invention is to provide means in a calf feeder whereby the animals may receive their food easily, so that they may eat quickly.

A further object of this invention is to provide a calf feeder which may be used for feeding a plurality of calves of different age, each calf receiving a proper amount of food.

A still further object of this invention is to provide a cleaner for this calf feeder, which may be used to properly and efficiently clean out the inside of the calf feeder, so that a good sanitary condition will exist.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational plan view of the calf feeder and cleaner comprising the present invention;

Figure 2 is a vertical sectional view taken substantially along the plane defined by reference line 2—2 of Figure 1 illustrating the details of construction thereof;

Figure 3 is a horizontal sectional view taken substantially along the plane defined by reference line 3—3 of Figure 2 illustrating the relation of the compartments to the feeder;

Figure 4 is a perspective view of the cleaner for the calf feeder comprising the present invention; and Figure 5 is a perspective exploded view of the novel type of valve used in conjunction with the calf feeder.

Referring now more specifically to the drawings, the numeral 10 generally designates the calf feeder comprising the present invention.

This invention contemplates the use of a can body 12 which is similar to that of large milk cans, having handles 14 near the upper end thereof. This can 12 has a rounded bottom 16, and an upper neck portion 18. This neck portion has an outwardly extending flange 20 for the reception of a cover.

A separator 22 having a spiral-like cross section, is inserted into the can, and has its outer points in contact with the inner periphery of the can, and is of a height extending from the bottom 16 up to the lower portion of the neck 18 of the can, so that a plurality of chambers 24 is formed therein. In the lower portion of the can, and communicating with each chamber 24 is an opening 26, into which is inserted a fitting 28. The fitting 28 has a circular flange 30 contacting the inner surface of the can 12 about opening 26. The fitting 28 also has an outwardly extending cylindrical portion having a threaded outer surface thereof. A cylindrical collar 32 having an internally threaded portion, is threaded onto the cylindrical portion of fitting 28. It is to be noted that the fitting 28 and collar 32 have openings extending therethrough so that the interior of the can may communicate with the atmosphere. A rod 34 extends transversely across the outer end of collar 32 and is affixed thereto. A pin 36 is mounted normal to rod 34 and extends inwardly therefrom, and has a slidable valve 38 mounted for movement thereon. A valve seat 40 is also mounted on pin 36, however, it is pressed into fitting 28 and is immovably located therein, and has a tapered portion which extends inwardly into can 12. A nipple 42 having an opening 44 in the outer end thereof, is located about the valve assembly and extends outwardly therefrom. A clamping element 46 is used to connect the nipple 42 to collar 32, so that they act as a unit and may be unthreaded from fitting 28.

It will now be realized, that when it is desired to feed a plurality of calves of different ages, they will be given different amounts of food. Therefore, each chamber 24 has a valve and nipple therefor, so that each calf may receive its own share of food. When liquid is put into the can 12 the pressure of the liquid will force a valve 38 outwardly against rod 34. Since there is clearance between the outer larger periphery of valve 38 and the inner surface of fitting 28, the food, usually milk, will be allowed to fill up nipple 42 because of the fluid pressure acting thereon. In order to get the milk from the nipple, the calves will bite on the inner portion of nipple 42 thus creating a pressure on the liquid in the nipple, and causing two actions to take place. The first action is for the pressure of the liquid to cause the valve 38 to be seated into valve seat 40, and thus prevent the flow of liquid in nipple 42 back into the can 12. The other action is for the milk in nipple 42 to flow out of opening 44. This device is better than those known heretofore in the art because of the fact that in previous devices there was no valve used in conjunction with the nipple, and therefore when the calf would bite on the nipple a substantial amount of milk would be allowed to flow back into the can 12, thus giving the calf a lesser amount of milk than it is able to consume. For this reason when this new and improved type of calf feeder is used, the calves will be able to eat much quicker, thus aiding people engaged in animal husbandry by shortening the feeding time of the calves. Furthermore, the calves will swallow less air while eating, because of the shorter time for the eating to be accomplished, and because of the quick and easy valve type motion which allows the calf to obtain milk from the nipple very quickly and easily, and so eliminates the gasping or grabbing of the nipple which so often causes a swallowing of air doing detrimental effects to the calves.

In order to clean out the interior of the can 12 and the chamber 24, it is necessary to use a special type of cleaner which has been designed for the purpose. This cleaner may be seen alone in Figure 4, and in conjunction with the calf feeder in Figure 2. This cleaner is in the shape of a cover for can 12, and comprises a cylindrical flange portion 48 corresponding to neck portion 18 of can 12, of slightly smaller diameter, and lying in contacting relation therewith when in position on the can. A circular bottom 50 is connected to the outer peripheral edge of flange 48. An outwardly extending flange 52 corresponding to flange 20 of the can, is connected to the upper edge of flange 48, and flange 52 has a U-shaped portion 54 which is adapted to rest over the upper edge of flange 20 of the can, so as to act as a further support for the cover. A circular top 56 is connected about the upper edges of flange 52, similar to and in spaced parallel relation with bottom 50, however, being of a larger diameter. A fitting 58, having a flange portion 60, contacting the undersurface of the top 56, extends upwardly and outwardly from top 56, so that a cylindrical externally threaded portion is available for easy access thereto. Openings 62 are formed in the bottom 50, and hollow tubes 64 extend downwardly therefrom, these tubes having openings 66 therein. It may now be seen that when it is desired to clean out the calf feeder, it is merely necessary to insert the cleaner in the top of the can, and connect a water hose or other source of water to fitting 58. The water will then flow into compartment 68 defined by top 56, flange portions 52 and 48, and bottom 50, and thence into opening 62 and to tube 64 and out of opening 66. Of course, one tube 64 will be provided for each chamber 24. If it is desired the water entering the compartments may be allowed to drain out of the valve.

It may now be seen that I have invented a new and improved type of calf feeder and cleaner therefor, which allows calves to eat faster, and swallow less air.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A feeder for animals comprising a container, at least one opening in the lower portion of said container, valve means in each opening, and a nipple mounted thereon, said valve means including a valve fitting in said opening, a collar on said fitting having a substantially centrally located pin therein, a valve seat disposed about said pin and located interiorly of said fitting, and a valve slidable on said pin.

2. An animal feeder comprising a cylindrical container having closed top and bottom walls, a divider in said container including vertically extending radially directed partitions engaging the wall of the container and dividing the latter into compartments, the wall of said container having a plurality of discharge openings each communicating with one of said compartments, a nipple assembly mounted in each opening and projecting outwardly from said container, said nipple assembly including an externally threaded bushing extending through said opening, an internally threaded sleeve received on said bushing, a valve stem rigidly mounted in one end of said sleeve and extending axially through the latter and into its compartment, a valve seat mounted on said stem and disposed in said bushing, a valve slidable upon said stem and in said sleeve and cooperating with said seat to control flow through said opening, a nipple secured to said sleeve and having continuous communication with the interior thereof.

References Cited in the file of this patent

UNITED STATES PATENTS

| | | |
|---|---|---|
| 2,228,520 | Hodsdon | Jan. 14, 1941 |
| 2,613,642 | Hiller | Oct. 14, 1952 |